Oct. 1, 1929.   O. A. ROSS   1,730,334
MAGNETIC CAR RETARDER
Filed Jan. 7, 1928   2 Sheets-Sheet 2

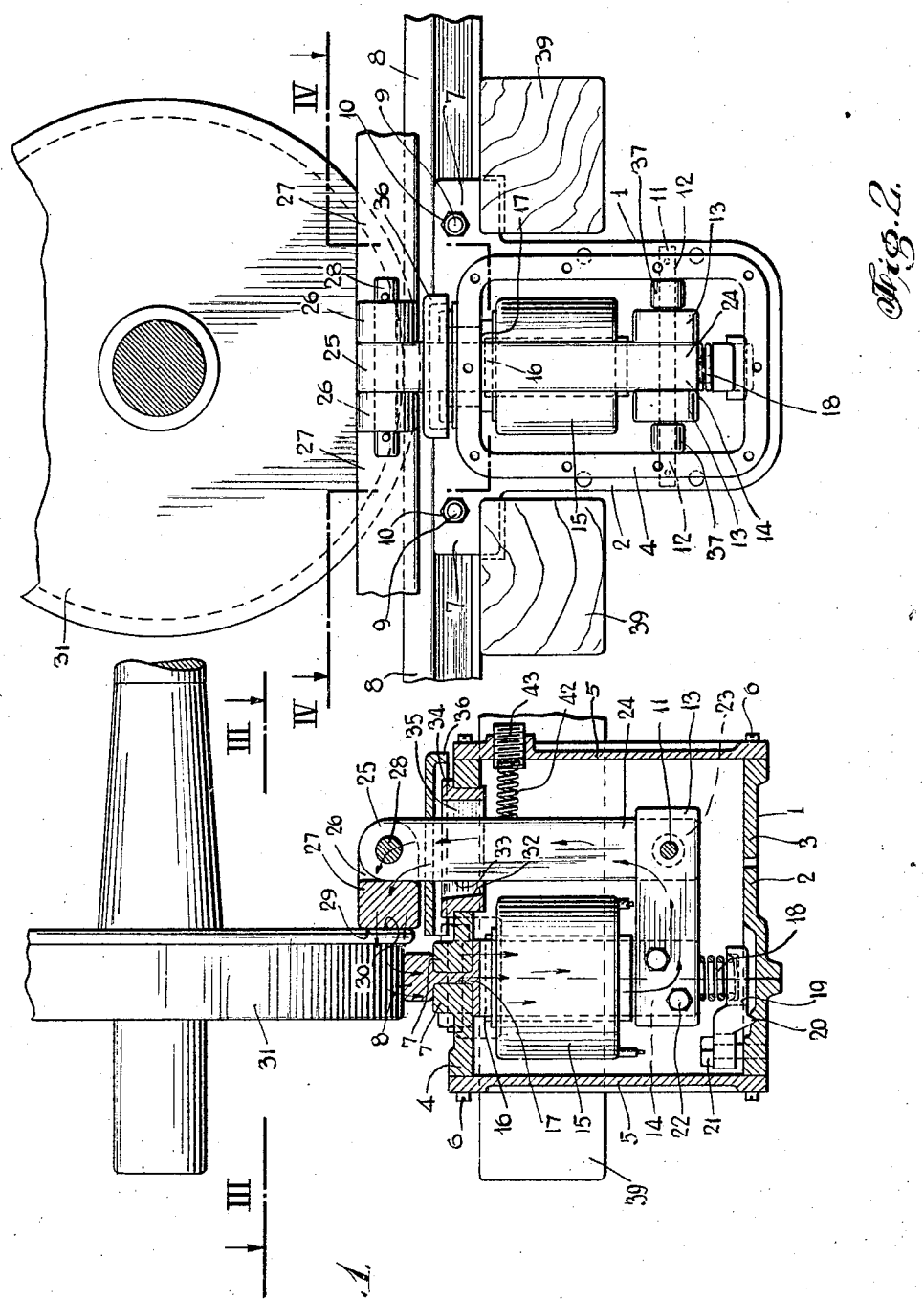

Patented Oct. 1, 1929

1,730,334

UNITED STATES PATENT OFFICE

OSCAR A. ROSS, OF NEW YORK, N. Y., ASSIGNOR TO GENERAL RAILWAY SIGNAL COMPANY, OF ROCHESTER, NEW YORK

MAGNETIC CAR RETARDER

Continuation of application Serial No. 245,141, filed January 7, 1928. This application filed January 7, 1928. Serial No. 245,143.

This invention refers to car retarders and more particularly to the class termed "magnetic car retarders" as disclosed in my co-pending application for Letters Patent Serial No. 245,141, filed January 7, 1928, and of which this application for Letters Patent forms a continuating application.

The prime object of this invention is to produce car retarding mechanism for retarding the movement of freight cars or similar vehicles wherein magnetic flux is employed as the medium, or agent for causing certain track instrumentalities to co-act with certain parts of said cars to effect said retardation.

Another object is to produce magnetic car retarding mechanism for retarding the movement of freight cars, or similar vehicles, wherein the magnetic flux is generated in a path comprising track instrumentalities and is completed by passage of said flux through a path formed by the peripheral section of the car wheels and the track rail in this manner providing a substantially short "foreign" flux path whereby more efficient magnetic braking may be obtained.

Another object is to produce a mechanism of the kind hereintofore described wherein a minimum number of movable parts are exposed to the elements, and whereby for continuous operation of said mechanism, a minimum of manual labor will be required for the removal of snow, sleet or ice if present.

Another object is to furnish a mechanism of the kind hereintofore described wherein the housing for said mechanism may be made of ferric material, however, by novel arrangement of the structure preventing substantial magnetic flux leakage when and as said flux is rendered effective to cause magnetic braking.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the forms, proportions, size and minor details of the device may be made without departing from the spirit of, or sacrificing any of the details of the invention.

In describing the invention in detail, reference is had to the accompanying drawings wherein I have illustrated embodiments of my invention, and wherein like characters of reference designate corresponding parts throughout the several views, and in which:—

Fig. 2 is a side elevation of the electro-magnetic car retarder shown in Fig. 1 with the cover removed making it a sectional elevation taken on the line II—II of Fig. 3, as viewed in the direction of the arrow;

Figure 1:
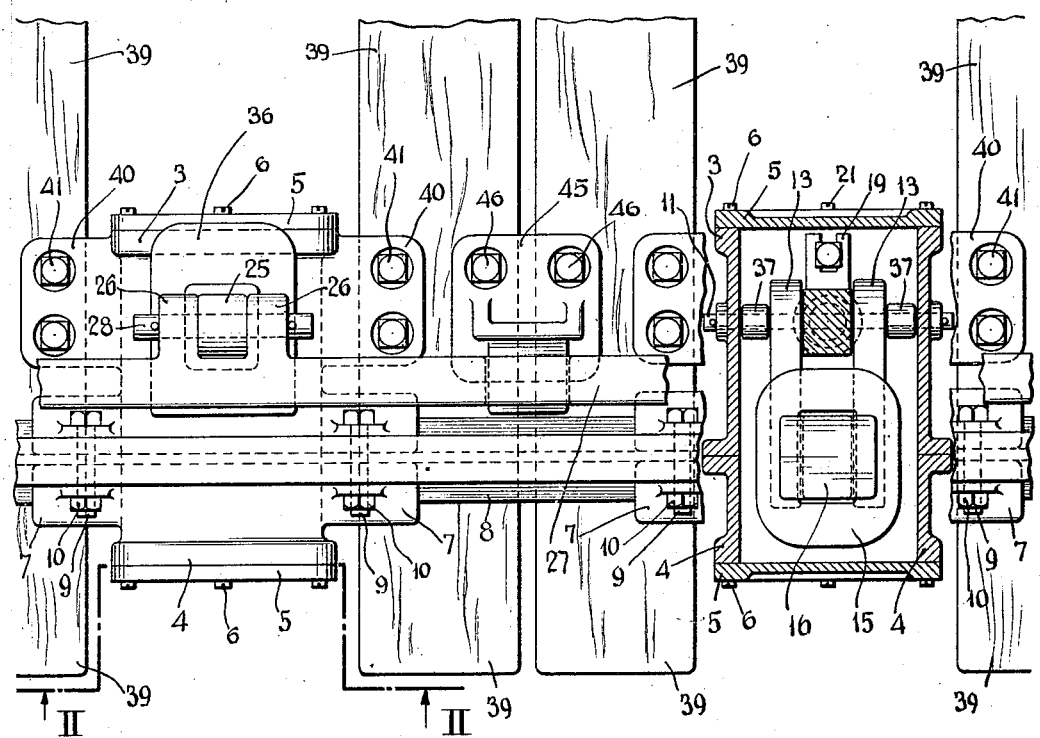
Fig. 1 is a sectional elevation of an electromagnetic car retarder embodying the present invention in connection with which a car-wheel and axle have been shown in elevation, the sectional elevation being taken on the line I—I of Fig. 3 of the drawings. as viewed in the direction of the arrows.

Referring to Figs. 1, 2, 3 and 4, the magnetism generating unit 1, hereinafter termed magnetic braking unit, comprises housing 2, of ferric material, the inner shell portion 3 of which is suitably bolted to the outer shell portion 4, as by bolts 9, each having a cover, as 5, secured by bolts, as 6. Said inner and outer shell portions having terminating elements 7—7, adapted to enter between the ball and base of rail 8 and impinge thereon, bolts 9 and nuts 10 acting to clamp, said sections onto said rail, as well as partially secure said inner and outer shells together.

Mounted on non-ferric material pin 11, passing through orfices 12—12 of inner shell 3 are magnetic yokes 13—13, one end of each of which is bolted to the lower end of fixed core 14 by bolts 22, said fixed core 14 having wound thereon a magnetic coil 15, the upper end 16 of this fixed core 14 is T shaped to provide a large area of contact for abutment against the under face 17 of rail 8, in this manner assisting in conducting the magnetic flux from said core to rail 8, spring 18, the lower end of which is adjustably seated in lever 19, pivoted on knife edge 20 and adjusted by screw 21, acting to restrain core 14 and therefore T head 16 against said lower rail face 17.

Pivotally secured to and interposed between the other end of magnetic yokes 13—13 is the lower end 23 of magnetic link, or bar 24 to the upper end 25 of which are pivoted lugs 26—26 formed as a part of friction bar 27, pin 28 acting to secure said bar and lugs together in hinged relation.

Friction bar 27 has a frictioned braking face 29, arranged to impinge on the inner face 30 of car wheel 31 of known form and adapted to move over rail 8.

Magnetic link, or bar 24 has a face 33 adapted to impinge on stop face 32 of bushing 34 secured to shell portion 3 and having an orifice 35 through which said link, or bar protrudes, the upper end 25 also having secured thereto, a shield, as 36 for preventing foreign matter entering housing 2 through said orifice. Bushing 34 is preferably made of non-ferric material as is also shield 36. Non-ferric material sleeves 37—37 supported by pin 11 act to properly aline and locate magnetic yokes 13—13 and link or bar 24 within housing 2.

Housing 2 also comprises lugs 40—40 secured to ties 39—39 by bolts 41—41, to which are also suitably secured the rails, as 8, only one being shown.

The upper end 25 of link or bar 24 is restrained inwardly by spring 42, one end of which is adjustably secured in adjusting nut 43 and the other end of which impinges on said link, or bar, in this manner normally causing face 33 of said bar to impinge on stop face 32 when no wheel as 31 is present on rail 8. The function of spring 42 is merely to cause initial contact of friction bar 27 with one, or more wheels as 31, as said wheels move over the rails, as 8.

Figure 3:
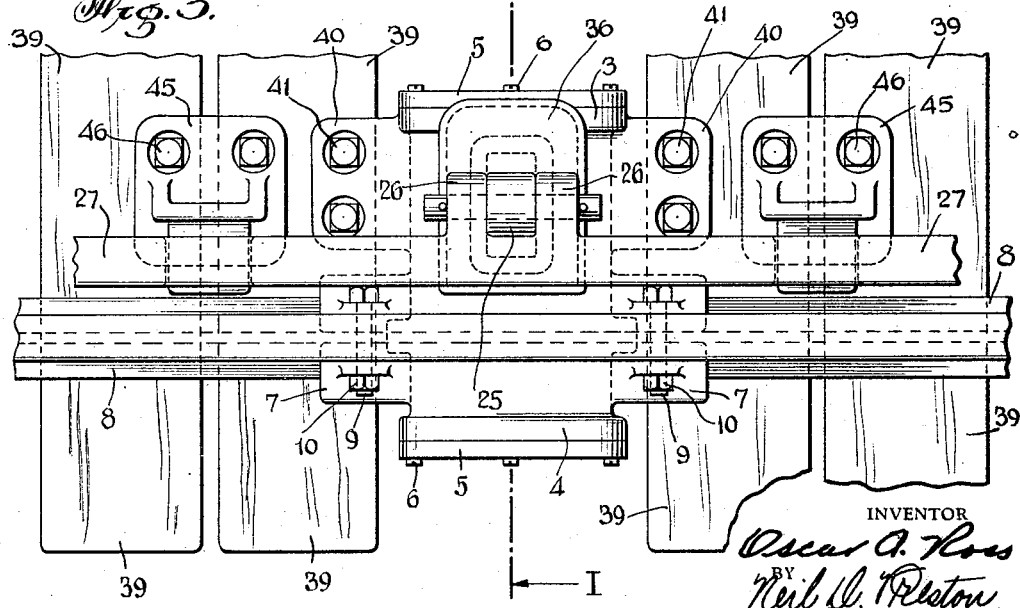
Fig. 3 is a plan view of the same car retarder with the car wheel and axle omitted and as viewed from the line III—III of Fig. 1 in the direction of the arrows; and, Fig. 4 is a plan elevation of the car retarder with a portion thereof shown in cross-section along the line IV—IV of Fig. 2 as viewed in the direction of the arrows.

Friction braking bars 27—27 are suitably guided by steering plates as 45—45 secured to tie 39—39 by bolts or lags 46—46 more fully described in my co-pending application for Letters Patent Serial No. 245,141 filed January 7, 1928, Fig. 4, showing one of said steering plates employed in connection with said bars of two magnetic braking units as 1—1, and Fig. 3 showing two of said steering plates in connection with said bars of one of said magnetic braking units. It is to be understood that said bars may be made of considerable length and that a number of magnetic braking units as 1, may be employed in connection therewith as more fully disclosed in the aforesaid co-pending application for Letters Patent.

The operation is as follows:—Electrical energy is supplied to coil 15, as more fully described in the aforesaid co-pending application for Letters Patent, and assuming that a car wheel, as 31 is present on rail 8, a magnetic flux is generated in a path indicated by the several arrows, (see Fig. 1). Said path comprising core 14, magnetic yokes 13—13, magnetic link, or bar 24 and its extension 25, pin 28, lugs 26—26 and thence to bar 27 from whence it passes from face 29 thereof to face 30 of wheel 31, thence through the peripheral section of said wheel to the ball of rail 8 and thence in multiple path through the web and base of said rail and mating sections 7—7 to the T head 16 and thence returning to core 14. It is to be noted from the foregoing description that a complete ferric magnetic circuit including a portion of wheel 31 and rail 8 has been formed without an air gap, in this manner producing a comparatively large magnetic flux in said path whereby, and as said wheel revolves on said rail, the friction faces 29 and 30 are caused to be rubbed one against the other to produce a braking effect, much in the same manner as if a brake shoe of known form were impinged on the periphery of said wheel by an air brake in known manner.

Whereas and when the electric circuit to the coils as 15—15 is opened a substantial residual magnetism obtains, said residual magnetism is dispersed by the continued movement of one or more of the wheels, as 31 and therefore the magnetic braking ceases substantially simultaneously with the opening of said electric circuit.

It is obvious that the friction bars 27—27 may be made of substantial length and that a number of magnetic braking units as 1 may be associated therewith for the purpose of establishing a car retarding zone as more fully described in the aforesaid co-pending application for Letters Patent.

It is to be noted that the friction brake bar 27 is arranged in a plane above the top of rail 8, in this manner permitting friction face 29 of said bar to engage a larger area of friction face 30 of wheel 31, than if said bar were arranged in a plane not higher than the top of said rail.

What I claim is:—

1. In combination with a trackway and a vehicle, the wheels of which are adapted to travel thereon, a friction brake shoe composed of magnetic material arranged adjacent a rail of the trackway and adapted to frictionally engage with a face of one or more of the wheels, and retard the movement of the vehicle, a magnet one pole of which is arranged to form a magnetic flux path into the rail and a magnetic yoke connecting the other pole of the magnet and the brake shoe whereby a complete magnetic flux path is formed through the shoe, the wheel, the rail, the magnet and the yoke, and means for inducing magnetic flux in the path.

2. A car retarder of the electro-magnetic type comprising; a track rail of magnetic material; a car wheel of magnetic material movable over said track rail; a core projecting downwardly from said track; a coil surrounding said core; a brake shoe disposed along the side and extending above the top of said rail; and a member magnetically connected to the lower end of said core and said brake shoe; whereby if said coil is energized said brake shoe is magnetically held against said car wheel by reason of magnetic flux passing through said member, said brake shoe, said car wheel, said track rail and said core in series.

3. A car retarder of the electro-magnetic type comprising; a track rail of magnetic material; a car wheel of magnetic material movable over said track rail; a core projecting downwardly from said track rail; a coil surrounding said core; a brake shoe; and a member magnetically connected to the lower end of said core and said brake shoe and extending around said coil; whereby if said coil is energized said brake shoe is magnetically held against said car wheel by reason of magnetic flux passing through said member, said brake shoe, said car wheel, said track rail and said core in series; and a housing of non-magnetic material for housing said core and coil.

4. A car retarder of the electro-magnetic type comprising; a track rail of magnetic material; a car wheel of magnetic material movable over said track rail; a core projecting downwardly from said track rail; a coil surrounding said core; and a member magnetically connected to the lower end of said core extending around said coil and having a brake shoe engaging said wheel; whereby if said coil is energized said brake shoe is magnetically held against said car wheel by reason of magnetic flux passing through said car wheel, said track rail and said core in series, a housing of non-magnetic material for housing said core and coil; and spring means for urging said brake shoe towards said car wheel.

Signed at New York city, in the county of New York and State of New York, this fifteenth day of December, A. D. 1927.

OSCAR A. ROSS.